(12) United States Patent
Breu et al.

(10) Patent No.: US 9,459,180 B2
(45) Date of Patent: Oct. 4, 2016

(54) METHOD FOR TESTING THE OPERABILITY OF A DRIVER ASSISTANCE SYSTEM INSTALLED IN A TEST VEHICLE

(71) Applicant: Audi AG, Ingolstadt (DE)

(72) Inventors: Alexander Breu, Weiding (DE); Stefan Schuberth, Ingolstadt (DE); Tobias Bulwahn, Ingolstadt (DE); Patrick Täuber, Hilpoltstein (DE); Julius Wolter, Heidesee (DE)

(73) Assignee: AUDI AG, Ingolstadt (DE)

( * ) Notice: Subject to any disclaimer, the term of this patent is extended or adjusted under 35 U.S.C. 154(b) by 148 days.

(21) Appl. No.: 13/787,270

(22) Filed: Mar. 6, 2013

(65) Prior Publication Data

US 2013/0238166 A1 Sep. 12, 2013

(30) Foreign Application Priority Data

Mar. 7, 2012 (DE) ........................ 10 2012 004 650

(51) Int. Cl.
*G01M 17/007* (2006.01)
*G05D 1/02* (2006.01)
*B60W 50/02* (2012.01)
*B60W 50/04* (2006.01)
(Continued)

(52) U.S. Cl.
CPC .......... *G01M 17/007* (2013.01); *G05D 1/0295* (2013.01); *B60W 30/12* (2013.01); *B60W 30/143* (2013.01); *B60W 30/16* (2013.01); *B60W 50/0205* (2013.01); *B60W 50/045* (2013.01); *B60W 2550/408* (2013.01); *G05D 2201/0213* (2013.01)

(58) Field of Classification Search
CPC .......... B60W 10/00; G08G 1/00; G08G 5/00
USPC ........... 701/1, 102, 115, 301, 31.4, 31.9, 45, 701/49, 96; 340/435, 425.5, 426.12, 340/426.22, 436, 901, 903, 936, 988
See application file for complete search history.

(56) References Cited

U.S. PATENT DOCUMENTS 5,295,551 A 3/1994 Sukonick
2004/0148063 A1* 7/2004 Patchell ........................... 701/1

(Continued)

FOREIGN PATENT DOCUMENTS

CN 101475002 7/2009
DE 10 2008 008 665 B3 6/2006

(Continued)

OTHER PUBLICATIONS

WO2012013552_machine translation, published Feb. 2, 2012, filed Jul. 20, 2011.*

(Continued)

*Primary Examiner* — Jelani Smith
(74) *Attorney, Agent, or Firm* — Henry M. Feiereisen LLC

(57) ABSTRACT

A method for testing the operability of a driver assistance system installed in a test vehicle and operating based on information supplied by sensors which detect a target vehicle traveling in the environment of the test vehicle, in particular a driver assistance system intervening in the longitudinal or transverse guidance of the motor vehicle, includes outputting control signals via a wireless communication link to at least partially control from the test vehicle the operation of the target vehicle for intentionally performing at least one defined driving maneuver.

11 Claims, 1 Drawing Sheet

(51) Int. Cl.
    *B60W 30/12*     (2006.01)
    *B60W 30/14*     (2006.01)
    *B60W 30/16*     (2012.01)

(56) References Cited

U.S. PATENT DOCUMENTS

| | | | |
|---|---|---|---|
| 2008/0021600 A1* | 1/2008 | Sohr | 701/1 |
| 2010/0030397 A1* | 2/2010 | Tachibana et al. | 701/1 |
| 2013/0024075 A1* | 1/2013 | Zagorski et al. | 701/46 |
| 2013/0166157 A1* | 6/2013 | Schleicher et al. | 701/50 |
| 2013/0238211 A1* | 9/2013 | Kuge et al. | 701/96 |

FOREIGN PATENT DOCUMENTS

| | | |
|---|---|---|
| DE | 10 2007 058 192 A1 | 9/2011 |
| DE | 10 2010 038 639 A1 | 2/2012 |
| EP | 0 625 543 B1 | 12/2004 |
| WO | WO 2012013552 A1 * | 2/2012 |

OTHER PUBLICATIONS

Chinese Search Report issued on Jan. 29, 2015 with respect to counterpart Chinese patent application No. 201310072183.3.

Translation of Chinese Search Report issued on Jan. 29, 2015 with respect to counterpart Chinese patent application No. 201310072183.3.

* cited by examiner

METHOD FOR TESTING THE OPERABILITY OF A DRIVER ASSISTANCE SYSTEM INSTALLED IN A TEST VEHICLE

CROSS-REFERENCES TO RELATED APPLICATIONS

This application claims the priority of German Patent Application, Serial No. 10 2012 004 650.2, filed on Mar. 7, 2012, pursuant to 35 U.S.C. 119(a)-(d), the content of which is incorporated herein by reference in its entirety as if fully set forth herein.

BACKGROUND OF THE INVENTION

The invention relates to a method for testing the operability of a driver assistance system installed in a test vehicle, and in particular a driver assistance system intervening in the longitudinal or transverse guidance of the vehicle.

The following discussion of related art is provided to assist the reader in understanding the advantages of the invention, and is not to be construed as an admission that this related art is prior art to this invention.

A set of defined, required test scenarios to be satisfied by the systems exist as part of the development and certification of driver assistance systems, especially those system that intervene in the longitudinal and/or transverse guidance. Driver assistance systems that are subject to these rigorous testing processes include systems used to warn of a longitudinal traffic collision, so-called FCW systems (FCW=Forward Collision Warning), as well as systems that automatically initiate a braking process, frequently also referred to as emergency brake assistant, so-called AEB systems (AEB=Automatic Emergency Brake). However, follow-on systems, i.e. systems that automatically follow a vehicle ahead and automatically adjust the distance through interventions, for example ACC (ACC=Adaptive Cruise Control), also fall into this category.

The test requirements are relatively complex, and it is expected that the number and complexity of these test scenarios will continue to rise in the future. Very strict demands are placed on the test procedure and the evaluation of the results, in particular with respect to the reproducibility and accuracy of the test scenarios to be performed, because the operability of the driver assistance systems can only be tested by actually driving the test vehicles, meaning that realistic test situations are set up. This means that the vehicle to be tested and the preceding vehicle representing a likely, critical obstacle must travel along exact, predetermined travel trajectories which are exactly defined by the test requirements. This in turn requires a long training period for the drivers of the vehicles wherein several trials must be performed until the required number of reproducible tests is successfully completed. Alternatively, the vehicles may be equipped with very complex, suitably programmed, controllable driving robotics capable of travelling along the desired driving profiles with the assistance of additional measures, such as corresponding external controls.

In other words, the implementation of the required, necessary tests is extremely difficult, time-consuming, cumbersome and associated with high costs. In particular, however, the reproducibility does not always satisfy all requirements. A change or extension of the required tests with new test scenarios or test variations is associated with significant effort.

It would therefore be desirable and advantageous to obviate prior art shortcomings and to provide an method for testing the functional capability of such driver assistance systems, which improves over previously known methods.

SUMMARY OF THE INVENTION

According to one aspect of the present invention, a method for testing operability of a driver assistance system installed in a moving test vehicle and responsive to information supplied by sensors capturing a target vehicle moving in the environment of the test vehicle, includes outputting control signals from the test vehicle via a wireless communication link, and at least partially controlling operation of the target vehicle from the test vehicle with the control signals to cause the target vehicle to intentionally perform at least one defined driving maneuver.

According to the inventive method, the test vehicle, in which the driver assistance system whose functionality is to be tested is installed, is used to control the target vehicle, which is to perform a defined maneuver defined by the test requirements. This means that the test vehicle can be viewed as a so-called master vehicle, whereas the target vehicle, which is controlled by the master vehicle, is quasi the slave vehicle. The data transmission, i.e. the transmission of the control signals from the test vehicle to the target vehicle, is wireless. Transmitted are all control signals necessary to control the target vehicle and its power units, respectively (e.g., engine, steering, brakes, etc.) so that the target vehicle travels along the desired driving trajectory, to which the test vehicle and its driver assistance system, respectively, must then react.

With this control and data communication, respectively, the driving scenarios and driving trajectories of the target vehicle required by the test specification can then be accurately represented. The test vehicle which drives, for example, behind the target vehicle can control the target vehicle so as to travel at a certain speed, with the test vehicle following at a certain speed. The test vehicle may control the target vehicle for carrying out corresponding, predetermined accelerations or decelerations or, when possible, control a steering intervention to change the lane, etc. Consequently, a number of different test scenarios can be represented by the test vehicle via the master control, without requiring either a highly trained staff or a driving robot. Of course, test drivers operating the two vehicles are needed for safety reasons; however, the test driver are no longer needed for the implementation of operations prescribed by the test requirements, for example adjusting the speed profiles, deceleration profiles, etc. Rather, all this is done simply by controlling the target vehicle from the test vehicle, which in turn adjusts target parameters commensurate with the test specifications and relating to its own speed, acceleration, deceleration, and the like.

Depending on the control signals provided by the master test vehicle, the slave target vehicle consequently performs a certain driving maneuver, to which the driver assistance system of the test vehicle reacts accordingly. This reaction by the test vehicle is recorded and can be evaluated accurately. Furthermore, an extremely high degree of reproducibility is provided, since the test scenarios are quasi performed as an automatic test process by the test and target vehicles "themselves", meaning that the desired, required speed profiles, decelerations, etc., can be automatically set and repeated as many times as desired. Any changes in a test process can be readily implemented, requiring only a change in the programming of the outputted control signals which are transmitted, on one hand, from the test vehicle to the target vehicle and are available, on the other hand, to the test vehicle for its own operation.

The control signals transmitted to the target vehicle are advantageously determined as a function of detection signals from sensors disposed in the test vehicle that detect the target vehicle, or from external sensors detecting and processing the position data supplied by the motor vehicles. The test vehicle is therefore superimposed on the vehicle's own sensors and sensor components, respectively (e.g. front sensors such as radar sensors, laser sensors, video camera, or the rear sensors with their corresponding radar sensors and the like), which means that the control signals are generated in the master vehicle for the slave vehicle based on the sensor data from the master vehicle's own environment sensors. For example, the master vehicle "drives" the slave vehicle in front, the distance between the two vehicles is continuously determined with its front sensors, as well as the corresponding relative speed, as well as the actual speed of the target vehicle and the own speed. This makes it possible to create defined initial conditions which represent conditions and output parameters, respectively, for a test, and to also continuously determine the subsequent deceleration of the slave vehicle commensurate with the test scenario, etc.

Any sensors, such as a video camera, front sensors, etc., as described above can be used as onboard sensors. Alternatively or additionally, however, reference sensors installed locally outside the vehicle, for example on respective measurement masts, for example as part of a DGPS control (DGPS=Digital Global Positioning System), including a local, stationary base station, may be used in addition to corresponding sensor systems in the two vehicles, wherein the base station determines from the sensor signals of the vehicles the appropriate speed and distance data, etc, which are then passed to the test vehicle which converts them into control signals.

According to another advantageous feature of the present invention, both motor vehicles may communicate with each other via bidirectional communication, that is, both vehicles and/or the respective control devices, respectively, which are provided as a central component for implementing the test in the respective vehicles, constantly exchange data over a defined protocol, so that both sides always know the current internal states, so that the entire process can be continuously monitored and diagnosed.

The test vehicle advantageously controls the target vehicle, as described above, in relation to acceleration or deceleration performance as well as the steering performance. For example, the operability of a tracking system, such as the aforedescribed ACC system, can be tested by controlling the acceleration and braking performance, to what extent this tracking system controls, for example, the vehicle tracking during an acceleration of the preceding vehicle, or in the case of a deceleration controls the own braking intervention. Even under strong deceleration, the brake assistant, i.e. the AEB system, can be tested, or the collision warning system, i.e. the above-described FCW system, etc. The functionality of the FCW and the AEB system can also be tested by, for example, controlling the steering behavior, for example, by simulating a merging operation of the target vehicle in front of the test vehicle, etc. However, scenarios with a target vehicle approaching from behind, for example for testing a lane change assistance system which attempts to avoid the dead angle, can be tested by detecting an approaching vehicle and outputting a warning signal in the event of an intended own lane change, and the target vehicle is controlled so that it approaches the test vehicle on a laterally offset lane, etc.

According to another advantageous feature of the present invention, the test vehicle may control the target vehicle by initially outputting control signals attaining a relatively a defined driving state of the target vehicle in relation to the test vehicle, relating to the respective actual speed of the relative speed, the distance, and/or the relative position, as detected by sensors, whereafter the control signals for executing the driving maneuver are provided. Prior to performing the own test scenario, i.e. when the defined maneuver is performed, the test vehicle controls the target vehicle initially such that the target vehicle assumes certain driving parameters, i.e. drives at a certain actual speed, or assumes a certain predetermined distance from the test vehicle, while the own test vehicle is obviously also driven so as to maintain certain parameters such as the actual speed and the like. Thus, the boundary conditions defined by the test specification are adjusted. Only then does the true test begin by providing the test control signals.

Advantageously, a plausibility check of the received control signals may be performed by the target vehicle for safety reasons, which are thereafter implemented depending on the test result. In addition, the target vehicle will make sure that no "unreasonable" control data are processed in order to avoid any accidents or other hazardous situations.

The information from the result, i.e. the detection of the behavior of the driver assistance system or of the sensor systems and the integrated actuators etc., respectively, relating to the test may be determined by sensors arranged in the test vehicle or external sensors which measure and process position data supplied by the motor vehicles. In other words, the test vehicle can itself make a self-diagnosis; however, is also conceivable to measure corresponding results with the aforedescribed DGPS device, i.e. for determining the deceleration behavior, etc. In this case, a reference sensor is included, which may improve the evaluation accuracy.

According to another advantageous feature of the present invention, control by the test vehicle for performing the driving maneuver may be possible only after an enable signal is outputted by the driver of the target vehicle, wherein preferably a status display indicates to the driver of the target vehicle whether a sufficiently stable driving state potentially required for the implementation of the driving maneuver has been attained. Accordingly, the real test may take place only when the driver of the target vehicle issues an enable signal, i.e., when it is thus ensured that the driver who under any condition and at any time always has the right to take over responsibility releases the test. It is conceivable to provide the driver with a status display, for example in the form of a color signal and the like, which indicates whether the output parameters forming the basis for the test (e.g., actual speed, relative distance, etc.) are maintained for a sufficiently long time, for example, for 5-10 seconds, so that the driver knows that the test boundary conditions are met and the test can be properly performed.

As described above, the driver of the target vehicle has at all times the right to take over responsibility over his own vehicle. Each actuation of the accelerator pedal, the brake pedal or the steering wheel while the target vehicle is controlled by the test vehicle causes immediate termination of the external control. The same may also apply to the driver of the test vehicle, i.e., that he also has always the right to take over responsibility.

According to another aspect of the invention, a test apparatus for testing the functionality of a driver assistance system, includes a test vehicle with the installed driver assistance system to be tested, said driver assistance system responsive to information supplied by sensors capturing a target vehicle moving in the environment of the test vehicle, a target vehicle, and a wireless communication link for transmitting control signals from the test vehicle to the target vehicle. The operation of the target vehicle is controlled from the test vehicle with the control signals to cause the target vehicle to intentionally perform at least one defined driving maneuver.

According to another advantageous feature of the present invention, both vehicles communicate bidirectionally, i.e., they each have a transmitting and a receiving device for bidirectional signal transfer.

Different bus systems, to which different control devices with associated actuators and sensors are connected, are usually installed in a vehicle. The signals are communicated on each bus with a specific message and signal protocol. To be able to process the control signals bus-specific, the target vehicle may advantageously include a signal converter, which converts the specific control signals provided by the test vehicle for controlling certain actuators into the required bus-specific signal structure of the target vehicle. This is necessary so that the bus-specific control devices can actually detect and process the actual signals associated with them.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
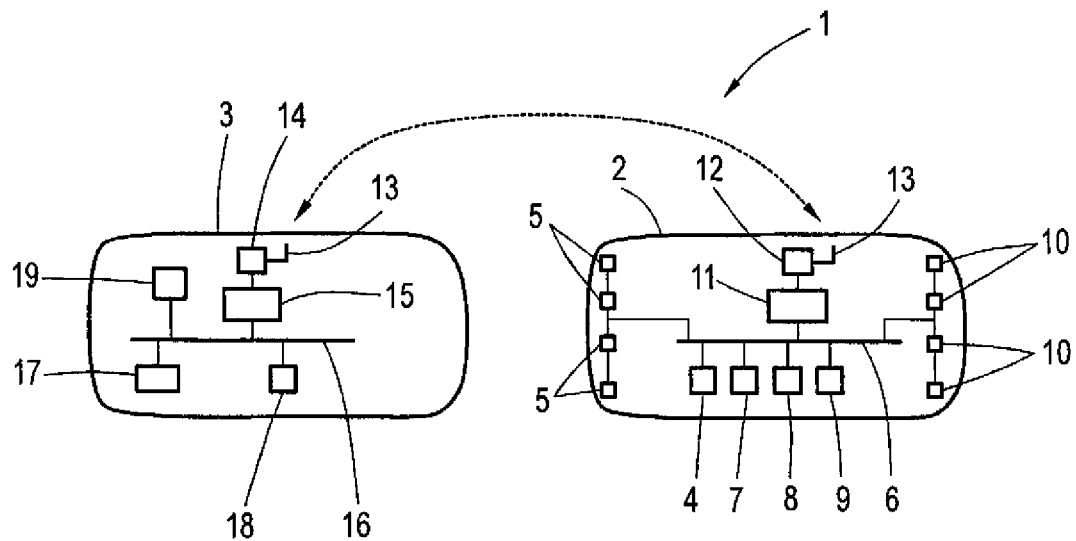
FIG. 1 shows a schematic diagram of a first embodiment of a test apparatus according to the present invention.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a test apparatus 1 according to the invention, which is suitable for carrying out the method according to the invention. Provided is a test vehicle 2 and a target vehicle 3. A driver assistance system to be tested, for example an FCW-System, i.e. a collision detection system, is installed In the test vehicle 2. The functionality of this system is, on one hand, represented in a suitable system control device 4 by using software; on the other hand, it includes the sensor signals from various sensors 5, here forward-looking sensors such as ultrasound sensors or radar sensors. The control device 4 is connected to a vehicle bus 6, to which in the illustrated example other controllers 7, 8, 9 and their (unillustrated) associated actuators or sensor systems, etc., are also connected. in the illustrated example, additional rear sensors 10 are provided, which are associated with other driver assistance systems, for example a lane change assistance system.

The test apparatus 1 further includes a control computer 11 installed in the test vehicle 2, which communicates with the bus 6 and accesses via the bus 6 the relevant data in the form of sensor signals, etc., necessary for its control tasks. A transmitting and receiving device 12, including an associated transmission antenna 13 which is provided for wireless, bidirectional data transfer to the target vehicle 3, is associated with the control computer 11.

The target vehicle 3 in turn also includes a combined transmitting and receiving device 14, which is connected to a downstream converter 15, which is configured to convert the control signals transmitted from test vehicle 2 and pertaining to the operation and/or control of the actuators installed in the target vehicle 3, commensurate with the message protocol and signaling protocol of a bus 16 (only one bus is shown in the illustrated example), so that the several actuator-specific control devices 17, 18, 19 attached to the bus 16 receive the corresponding control signals in the correct form. It will be understood that more than three control devices may be integrated.

The control signals are used to control these actuators accordingly. They are configured such that they can perform with the target vehicle 3 a very specific, defined driving operation and hence a defined driving maneuvers. For example, the control device 17 may be a motor controller which controls the engine of the target vehicle 3 for adjusting the actual speed. The control device 18 controls, for example, the brake system to perform a specific deceleration, up to an emergency stop, whereas the control device 19 controls, for example, the steering actuators for performing an intentional evasive or cornering maneuver, without requiring intervention by the driver who inherently sits in the target vehicle. It will be understood that a driver also sits in the test vehicle; however, this driver does not need to be active during the steering intervention.

The control signals sent by the test vehicle 2 to the target vehicle 3 are generated using the sensor systems of the test vehicle 2. These sensor systems, for example the sensors 5, continuously measure for example the distance to the target vehicle 3, wherefrom the relative speed and the actual speed of the target vehicle can be deduced, etc. The test vehicle 2 can in this way quasi "guide" the target vehicle "in front" and set defined speed and separation conditions, which may form the basis for, for example, subsequently transmitting control signals for carrying out a specific driving maneuver, for example a strong braking operation or the like. Of course, the control computer 11 also ultimately controls at least partially the operation of the test vehicle, since the test vehicle must also attain certain basic driving parameters, such as a defined actual speed, for implementation by the assistance system tests.

A test scenario and its implementation according to the invention will now be described with reference to an example.

It will be assumed that a collision assistance system to be tested, i.e. an FCW-system, is installed in the test vehicle 2. The test specification for such a system requires that both vehicles 2, 3 each travel for at least 5 seconds at 72 km/h (tolerance±1.6 km/h) with a separation of 30 m (tolerance±2 m). When this condition is stable, the preceding vehicle must decelerate to $-3$ m/s$^2$ with a defined deceleration ramp from $-2$ m/s$^3$, whereafter it brakes with this constant deceleration. The test vehicle 2, which functions as the master vehicle in relation to the slave vehicle, i.e. the target vehicle 3, must then react to the increasingly critical situation within a defined time window with a warning intervention, because the test vehicle 2 which does not decelerate gets even closer to the target vehicle 3.

The method according to the present invention works in this situation as follows:

a) The test vehicle 2 travels behind the target vehicle 3 and activates the "remote control" for the target vehicle 3, i.e., the control computer 11 begins the remote-control operation and establishes a communication link to the target vehicle 3.

The "remote control" is based on the collected data, in the illustrated example from the front sensors 5 of the test vehicle 2. The position of the target vehicle 3 is cyclically detected and processed, i.e., the sensors 5 continuously detect the rear of the target vehicle 3. Using these data and based on the own driving condition which is continuously received from the control computer 11 via the bus 6, the control commands for the target vehicle 3 are generated in the control computer 11 by closed loop control.

b) The closed loop control of the test vehicle 2, i.e. of the control computer 11, is now in a position to allow the target vehicle to 3 to drive in front in an online-adjustable or fixed preset separation window, relative speed window or time-interval window, meaning that the test vehicle 2 "pushes" the target vehicle 3 in front. In the example, the closed loop control operates so as to remotely control the target vehicle 3 from the test vehicle 2 based on time-gap control, wherein the time-gap control is applied such that a distance value of precisely 30 m is maintained at a reference speed of 72 km/h (corresponding to 20 m/s). This means that the desired time-gap for the control strategy is 1.5 s.

The control computer 11 in the test vehicle 2 provides as control signals for the "remote control" of the target vehicle 3 the following exemplary quantities: braking torque or deceleration target value for the brake system of the target vehicle 3, drive torque or acceleration target value for the engine system of the target vehicle 3, a steering torque or a steering angle for the steering system of the target vehicle 3, optionally control signals for the optional parking brake of the target vehicle 3, control signals for operating the transmission of the target vehicle 3 or the instrument cluster, etc.

c) The necessary control signals which allow the target vehicle 3 to travel according to the intentions of the master test vehicle 2, are transmitted via the wireless interface, here the transmitting and receiving device 12 together with the antenna 13, to the transmitting and receiving device 14 of the target vehicle 3, as shown by the double arrow in FIG. 1. In addition, status signals are transmitted, which are used for monitoring and testing the communication.

d) When plausible control signals are received in the target vehicle 3 (meaning that a plausibility check is performed by the transmitting and receiving device 14 or the converter 15), these control signals will be forwarded to the corresponding vehicle control devices 17, 18, 19, depending on which systems are subsequently included, and from there functionally processed by the associated actuator components, thereby causing the desired system reaction. The control devices are associated with, for example, the control device of the ESP (ESP=electronic stability program), of the engine, of the braking system, etc.

The connection to the bus 16 occurs via the converter 15 (bypass connection), which maps the necessary control signals within the correct message and signal structure onto the bus system 16, so they can be processed and implemented accordingly by the receiver control devices.

e) In the afore-described situation, the state is regulated, so that, when the test vehicle travels at 72 km/h, the target vehicle drives in front at the same speed and at a constant distance of 30 m. Starting from this reproducibly representable state, arbitrary, preset deceleration profiles can now be transmitted by the master test vehicle 2 to the target vehicle 3, thereby allowing the desired test scenario to proceed.

In this situation, the test vehicle 2 then transmits control signals that define a deceleration ramp of $-2$ m/s$^3$ for a deceleration value of $-3$ m/s$^2$, which is then received by the control device 18 and implemented by the respective associated actuators. This means that the target vehicle 3 definitely brakes commensurate with the tests requirements.

f) The test vehicle 2 and the target vehicle 3 constantly exchange internal states via a defined protocol, so that a respective current status is always known on both sides, and the process can be monitored and diagnosed.

g) The driver in the target vehicle 3 therefore does no longer need to drive the test maneuver himself; however, the necessary safety separation remains. In other words, he needs to release the remote control of his vehicle, for example at the beginning of the "takeover" by the test vehicle 2, in order to regulate the initial state (72 km/h with a constant separation of 30 m), as well as in particular to transmit the actual test control signals (in this case the deceleration ramp). This signal transmission can, for example, occur only when the driver has given a release signal, which is transmitted via the wireless interface of the target vehicle 3, after having being informed of that this stationary, stable state for a certain time. The driver may revoke the release at any time and thus begin to take over full control of the vehicle himself. This happens anyway with each active intervention by the driver at the brake pedal, the accelerator and the steering.

The data may be transmitted via the bidirectional data communication link, for example, based on WLAN. However, other modes of communication may also be contemplated.

Instead of determining the control signals only in the control computer 11, reference sensors may be incorporated in the test apparatus 1. For this purpose, an (unillustrated) pole with a corresponding measurement sensor is provided, which communicates with the two vehicles, which continuously transmit their respective position data. In other words, a DGPS system is provided. The data determined by the external base station can be supplied to the control computer 11, which then converts these signals to control signals or derives therefrom the control signals. This means that an external reference sensor is used. However, this is not mandatory.

In summary, the tests can be performed reliably and highly accurately in the manner described above, i.e., the driving maneuver proceeds extremely accurately, is executed only under very specific, defined boundary conditions, and is always performed only with specific, predefined maneuver parameters, without the need for any serious actions by a driver.

Figure 2:
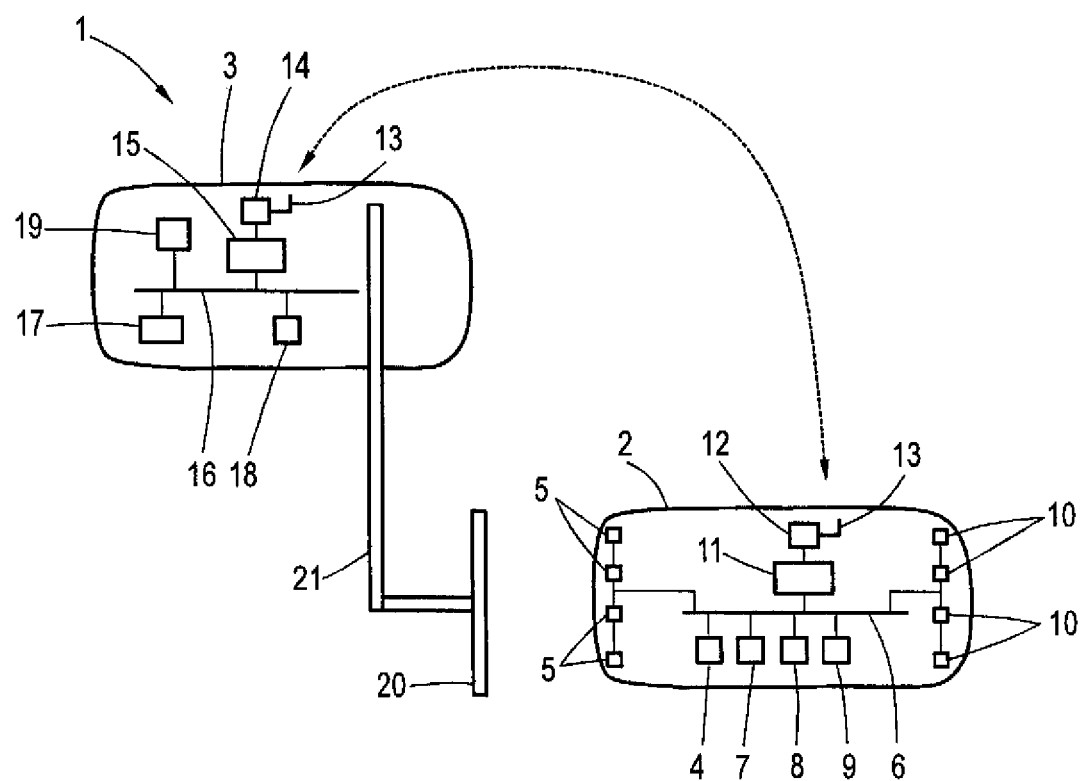
FIG. 2 shows a schematic diagram of a second embodiment of a test apparatus according to the present invention.

FIG. 2 shows a similar test apparatus 1, wherein identical reference numerals are used for identical components.

Unlike the test apparatus 1 of FIG. 1, a target simulator 20 that can be exposed to a crash is provided, which is arranged on a carrier 21 of the target vehicle 3. The target vehicle 3 hereby acts as a carrier vehicle for the target simulator 20. This embodiment is provided in functional tests, where the test vehicle 2 must collide with the target simulator.

The operation of this test apparatus 1 is however identical to that of the test apparatus described with reference to FIG. 1.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A method for testing operability of a driver assistance system installed in a moving test vehicle and responsive to information supplied by sensors capturing a target vehicle moving in an environment of the test vehicle, comprising:
    outputting control signals from the test vehicle via a wireless communication link,
    initially providing from the test vehicle to the target vehicle control signals for at least one reproducible test scenario, the control signals detected by the sensors of the test vehicle for causing the target vehicle to attain, without driver intervention by a driver of the target vehicle, a defined first driving state relative to the test vehicle with respect to at least one of a respective actual speed, a relative speed, a separation and a relative position,
    thereafter controlling, without driver intervention by the driver of the target vehicle, operation of the target vehicle from the test vehicle with the control signals to cause the target vehicle to intentionally perform at least one defined driving maneuver to attain a defined second driving state different from the first driving state,
    with the driver assistance system installed in the test vehicle, intervening in at least one of longitudinal and transverse guidance of the test vehicle based on a change from the first driving state to the second driving state to produce a reaction in the test vehicle, the reaction being recorded and evaluated,
    wherein the control signals of the at least one test scenario can be reproducibly implemented.

2. The method of claim 1, wherein the control signals are determined based on detection signals from sensors disposed in the test vehicle and capturing the target vehicle.

3. The method of claim 1, wherein the control signals are determined based on detection signals from external sensors that capture and process position data supplied by the test vehicle and the target vehicle.

4. The method of claim 1, wherein the test vehicle and target vehicle communicate with each other via a bidirectional communication link.

5. The method of claim 1, wherein the test vehicle controls the target vehicle with respect to at least one of acceleration, deceleration or steering.

6. The method of claim 1, further comprising:
    performing a plausibility check of the control signals received by the target vehicle, and
    converting the control signals in the target vehicle depending on a result of the plausibility check.

7. The method of claim 1, and further comprising:
    determining result information relating to an operability test with sensors installed in the test vehicle or with external sensors that acquire, and
    processing position data provided by the test vehicle and the target vehicle.

8. The method of claim 1, wherein while the target vehicle is controlled by the test vehicle, control by the test vehicle is terminated immediately upon actuation of an accelerator pedal, a brake pedal or a steering wheel by the driver of at least one of the target vehicle and the test vehicle.

9. A test apparatus for testing functionality of a driver assistance system, comprising:
    a target vehicle,
    a test vehicle with the installed driver assistance system to be tested, said driver assistance system responsive to information supplied by sensors capturing a target vehicle moving in an environment of the test vehicle and intervening in at least one of longitudinal and transverse guidance of the test vehicle based on a change from a first driving state of the target vehicle to a second driving state of the target vehicle to produce a reaction in the test vehicle, the reaction being recorded and evaluated, and
    a wireless communication link for transmitting control signals from the test vehicle to the target vehicle,
    wherein operation of the target vehicle is controlled from the test vehicle with the control signals by
    initially providing from the test vehicle to the target vehicle control signals for at least one reproducible test scenario detected by the sensors of the test vehicle for causing the target vehicle to attain, without driver intervention by a driver of the target vehicle, the first driving state relative to the test vehicle with respect to at least one of a respective actual speed, a relative speed, a separation and a relative position, and
    thereafter controlling, without driver intervention by the driver of the target vehicle, operation of the target vehicle from the test vehicle with the control signals to cause the target vehicle to intentionally perform at least one defined driving maneuver to attain the second driving state different from the first driving state,
    wherein the control signals of the at least one test scenario can be reproducibly implemented.

10. The test apparatus of claim 9, wherein the test vehicle and the target vehicle comprise a transmitting and receiving device for bidirectional signal transfer.

11. The test apparatus of claim 9, wherein the target vehicle comprises a signal converter configured to convert the control signals provided by the test vehicle for controlling actuators into bus-specific signals commensurate with a signal protocol of the target vehicle.

* * * * *